(12) United States Patent
Ma

(10) Patent No.: US 10,919,005 B2
(45) Date of Patent: Feb. 16, 2021

(54) WIND-DRIVEN ROTATING AND SHAKING BREATHER AND BREATHING METHOD

(71) Applicant: SunSun Electronic Technology Inc., Boulder, CO (US)

(72) Inventor: Huixin Ma, Boulder, CO (US)

( * ) Notice: Subject to any disclaimer, the term of this patent is extended or adjusted under 35 U.S.C. 154(b) by 0 days.

(21) Appl. No.: 16/442,560

(22) Filed: Jun. 17, 2019

(65) Prior Publication Data

US 2020/0108357 A1    Apr. 9, 2020

(30) Foreign Application Priority Data

Oct. 9, 2018   (CN) .......................... 2018 1 1174403

(51) Int. Cl.
| | | |
|---|---|---|
| *B01F 3/00* | (2006.01) | |
| *B01F 3/04* | (2006.01) | |
| *B01F 5/00* | (2006.01) | |
| *B01F 7/22* | (2006.01) | |
| *C12G 1/00* | (2019.01) | |

(52) U.S. Cl.
CPC ........ *B01F 3/0473* (2013.01); *B01F 3/04794* (2013.01); *B01F 5/0057* (2013.01); *B01F 7/22* (2013.01); *C12G 1/00* (2013.01); *B01F 2215/0072* (2013.01)

(58) Field of Classification Search
CPC ............... B01F 3/0473; B01F 7/00275; B01F 2215/0072; B01F 7/22; B01F 3/04794; C12G 1/00

See application file for complete search history.

(56) References Cited

U.S. PATENT DOCUMENTS

| | | | | |
|---|---|---|---|---|
| 6,508,163 B1* | 1/2003 | Weatherill | ............. | A47G 23/00 |
| | | | | 261/112.1 |
| 10,220,357 B1* | 3/2019 | Hsueh | ................ | B01F 7/00916 |
| 2010/0090355 A1* | 4/2010 | Weatherill | .......... | B01F 3/04794 |
| | | | | 261/26 |
| 2013/0319253 A1* | 12/2013 | Smith | ................ | B65D 39/0005 |
| | | | | 99/323.1 |

* cited by examiner

*Primary Examiner* — Anshu Bhatia
(74) *Attorney, Agent, or Firm* — Prakash Nama; Global IP Services, PLLC

(57) ABSTRACT

Disclosed is a wind-driven rotating and shaking breather, comprising an open container having a circular cross section, and a lid covering an opening of the open container and having a wind wheel and a motor. A rotating shaft of the motor is connected to the wind wheel. The wind wheel is mounted on a lower portion of the lid and composed of an impeller and a flat bottom plate disposed below the impeller. The wind wheel, horizontally arranged, is inserted into the open container and located above red wine contained in the open container. An edge of the lid or a side wall of the container is provided with an air outlet. The motor drives the wind wheel to extract air in the open container and discharge the air from the air outlet. By using the breather, the purpose of fast breathing is achieved. Also disclosed is a breathing method.

8 Claims, 4 Drawing Sheets

WIND-DRIVEN ROTATING AND SHAKING BREATHER AND BREATHING METHOD

BACKGROUND OF THE INVENTION

The present invention relates to a breathing device for red wine, and more particularly relates to a wind-driven rotating and shaking breather and a breathing method.

Wine in a bottle is like a sleeping beauty, which lacks aura although being beautiful. Breathing can inspire the aura of the wine. When the wine is exposed to fresh air and is fully breathed, tannins in the wine will gradually oxidize, the fragrance will gradually evaporate along with the oxidation process, and the taste of the wine will become more mellow and soft. Premium wines need to be breathed because of high tannin content. On the one hand, breathing can improve the taste and, more importantly, achieve a potential for high quality. Wines that need to be breathed include most of Cabernet Sauvignon, Syrah, Malbec, Petit Syrah and many Italian wines such as Barolo, Chianti, Montepulciano d'Abuzzo and Super-Tuscans.

For light red wines, by means of an open time of injecting into a breather (including a flow process during injection), the wine can be exposed to the air in a large area (the space and opening of the breather are large), thereby accelerating softening of tannins and full release of closed aroma. The process is breathing, commonly known as "breathing." In addition, after "changing a bottle" for aged red wine, a sommelier will generally consult a customer: Do you require breathing? The purpose is to allow a possible sulfur odor to dissipate as quickly as possible.

The traditional breathing process usually takes one night or longer. It has been found that pouring red wine into a round container for shaking can shorten the time required for breathing. There are also some products on the market that use mechanical devices to stir red wine to make it quickly breathed. However, these products are not only bulky, but also complicated in structure, which is not conducive to use and cleaning. Moreover, it has been proved that excessive stirring of red wine may also cause flavor substances in red wine to be oxidized or volatilized, which will reduce the quality of the red wine.

BRIEF SUMMARY OF THE INVENTION

An object of the present invention is to provide a wind-driven rotating and shaking breather. Another object of the present invention is to provide a breathing method.

According to an aspect of the present invention, a wind-driven rotating and shaking breather is provided. The wind-driven rotating and shaking breather includes an open container having a circular cross section and a lid covering an opening of the open container. The lid is provided with a wind wheel and a motor. A rotating shaft of the motor is connected to the wind wheel. The wind wheel is mounted on a lower portion of the lid and composed of an impeller and a flat bottom plate. Blades of the impeller are disposed around the rotating shaft of the motor. The flat bottom plate is disposed below the impeller. The wind wheel, horizontally arranged, is inserted into the open container and located above red wine contained in the open container. An edge of the lid or a side wall of the container is provided with an air outlet. When the motor drives the wind wheel to rotate, air in the open container is extracted and discharged from the air outlet, such that a micro-negative pressure state is formed inside the open container to drive the red wine at the bottom of the open container to spirally periodically rotate along a side wall of the bottom of the open container.

When the wind wheel of the wind-driven rotating and shaking breather adopting the above technical solution rotates, air flow formed by extracting air in the open container acts on red wine at the bottom of the open container, thereby driving the red wine to shake and rotate so as to be fully exposed to the air in the process. The oxidation of tannins is accelerated, and the purpose of fast breathing is achieved. Since the air flow is adopted for driving, the wind wheel does not come into contact with the red wine, which is not only cleaner and more hygienic, but also easier to clean after use. When a stable state is reached, the red wine periodically shakes and rotates along an inner wall of the open container. Compared with the method of directly blowing air to red wine, a strong air flow is not formed during the breathing process, thereby reducing the situation of oxidation or volatilization of flavor substances in the red wine, which is conducive to ensure the quality of the red wine.

In some embodiments, the lid is further provided with a control panel, the control panel being provided with a speed control switch for adjusting a rotation speed of the motor. Thus, the rotation speed of the wind wheel can be adjusted according to the variety of red wine to achieve the best breathing effect.

In some embodiments, the speed control switch is a potential knob with a switch function.

In some embodiments, the lid is further internally provided with a charging circuit and a storage battery. Thus, the wind-driven rotating and shaking breather may be charged, which is very convenient.

In some embodiments, the lid is further internally provided with a battery case for mounting a battery. Thus, the wind-driven rotating and shaking breather may use a dry battery, which is more convenient.

In some embodiments, the open container is a wine glass or a breathing bottle or a breathing pot.

In some embodiments, a main body of the open container is spherical or approximately spherical. The spherical shape makes it easier for the red wine to periodically shake and rotate along the inner wall of the open container.

In some embodiments, the bottom of the open container forms a spherical projection upward. The spherical protrusion may concentrate the red wine on the periphery of the bottom of the open container to form a thick-periphery thin-middle state, which facilitates the formation of a vortex flow in the early stage, and also facilitates the formation of obvious peaks in the later stage.

In some embodiments, a lower surface of the lid is further provided with an LED lamp. Thus, at the time of breathing, light can be matched to achieve the effect of heightening the drinking atmosphere.

According to another aspect of the present invention, a breathing method is provided. The breathing method includes the following steps:

S1, performing an air extracting operation at an opening of an open container containing red wine by using a wind wheel, and discharging air inside the open container;

S2, applying an acting force on the red wine contained at the bottom of the open container by air flow formed when the wind wheel discharges the air, such that the red wine is in a disorderly turbulent state;

S3, continuously discharging the air by the wind wheel to intensify the turbulent state of the red wine and form a rotation at the bottom of the open container;

S4, allowing the wind wheel to continuously rotate, such that the open container is in a micro-negative pressure state, the amount of air discharge is reduced, the turbulent state of the red wine is weakened while the rotation speed is increased, and a vortex flow is gradually formed at the bottom of the open container;

S5, allowing the wind wheel to continuously rotate, such that the micro-negative pressure state in the open container tends to be stable, substantially no air is discharged, and the red wine climbs for a certain height along the internal side wall of the open container and rotates on the internal side wall of the open container at a uniform rotation speed, the red wine rotating with obvious peaks; and S6, transmitting the work done by the rotation of the wind wheel to the red wine, such that the wine shakes and rotates in a stable state.

In some embodiments, a bottom plate is disposed below the wind wheel, and the air in the open container enters the wind wheel from an internal side wall of the bottom plate and is then extracted by the wind wheel.

The principle of the breathing method is as follows:

Firstly, when the wind wheel rotates, air in the open container is extracted, the air pressure in the open container is lowered, and the air extracted by the wind wheel is gradually reduced until an equilibrium state is reached. In this state, the wind wheel basically extracts air, and all of its work is converted into a disturbance to the air inside the open container.

Secondly, the acting force of air extraction formed when the wind wheel rotates can be decomposed into an upward extraction force in a vertical direction and a rotational force rotating along the inner wall of the open container. The extraction force and the rotational force act simultaneously on the red wine contained at the bottom of the open container. When the stable state is reached in the later stage, the extraction force causes the red wine to climb along the inner wall of the open container, and the rotational force causes the red wine to rotate along the inner wall of the open container, thereby making the red wine have both a shaking state and a rotating state. The climbing height and rotation speed of red wine are positively correlated with the extraction force and the rotational force, and the extraction force and the rotational force correspond to the output kinetic energy of the wind wheel. Therefore, the climbing height and rotation speed of the red wine can be adjusted by adjusting the rotation speed of the wind wheel to further adjust the breathing efficiency.

Further, the red wine shakes and rotates inside the open container, which greatly increases the contact area between the red wine and the air, and also has the function of stirring and homogenizing, thereby achieving the purpose of rapid breathing.

DETAILED DESCRIPTION OF THE INVENTION

Figure 1:
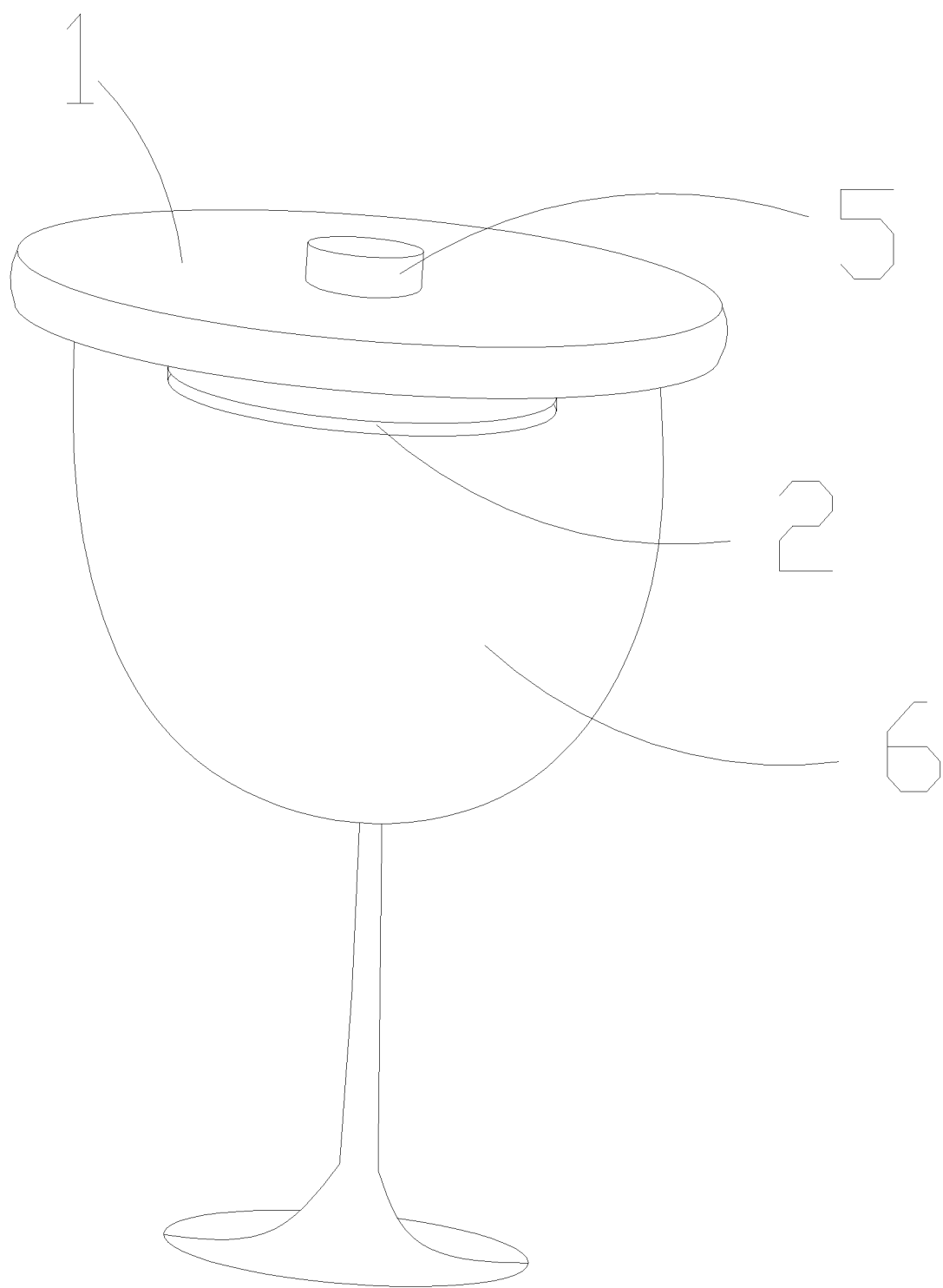
FIG. 1 is a schematic structure view of a wind-driven rotating and shaking breather according to an embodiment of the present invention.
Figure 2:
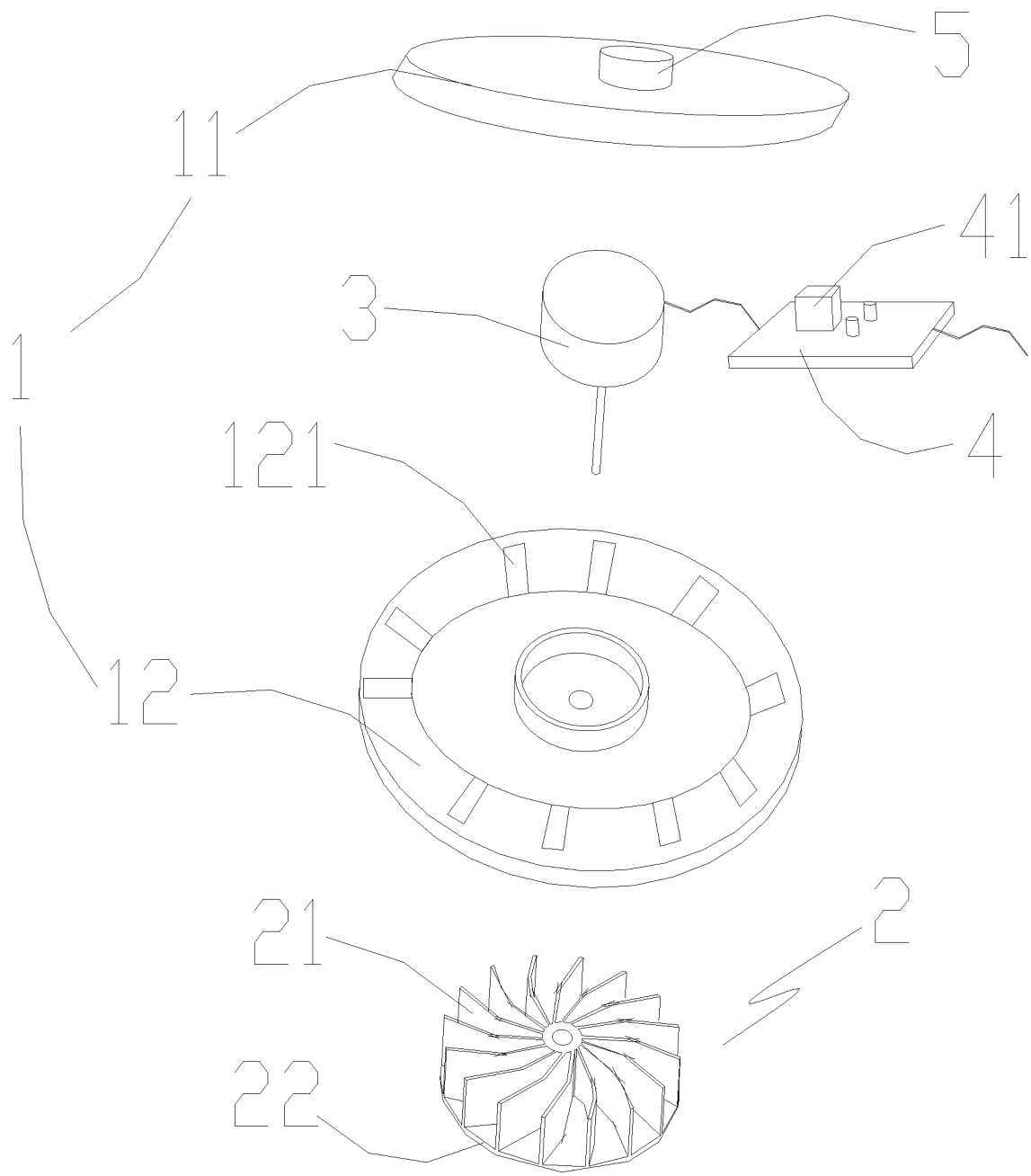
FIG. 2 is an assembly view of a lid shown in FIG. 1.
Figure 3:
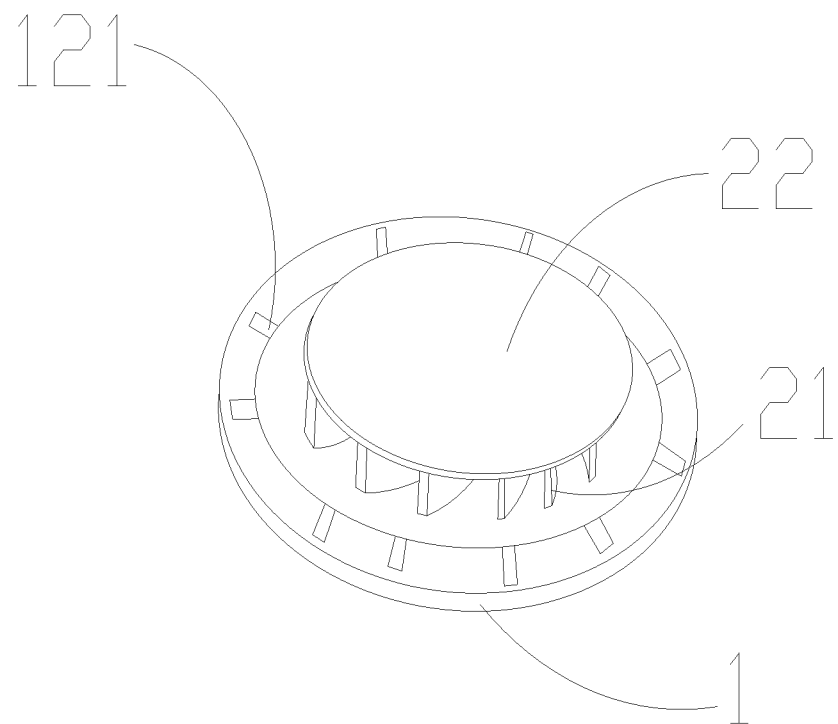
FIG. 3 is a schematic bottom structure view of the lid shown in FIG. 1.
Figure 4:
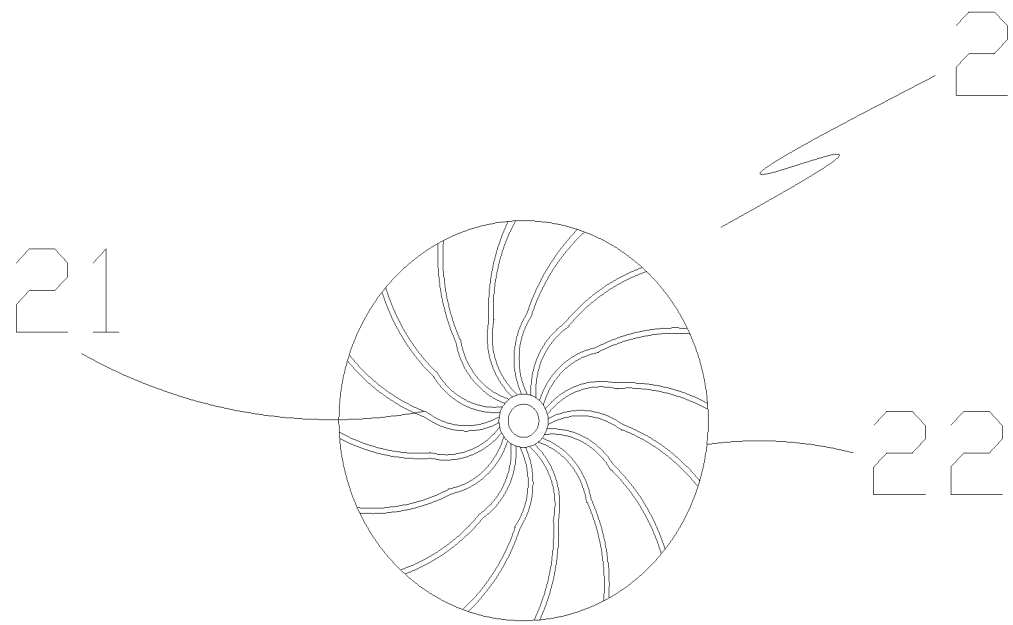
FIG. 4 is a schematic structure view of a wind wheel shown in FIG. 1.

The present invention will now be described in further detail with reference to the accompanying drawings.

Embodiment 1

FIG. 1 to FIG. 4 schematically show a wind-driven rotating and shaking breather according to an embodiment of the present invention. As shown in the figures, the device includes a wine glass 6 and a lid 1 covering an opening of the wine glass 6.

The lid 1 is formed by buckling an upper cover 11 and a lower cover 12.

The lid 1 is provided with a wind wheel 2 and a motor 3.

A rotating shaft of the motor 3 is connected to the wind wheel 2.

The lid 1 is further internally provided with a charging circuit 4 and a storage battery 41 connected to the motor 3.

The wind wheel 2 is mounted on a lower portion of the lid 1, and a lower end surface thereof is a closed plane.

The wind wheel 2 mainly includes an impeller 21 and a bottom plate 22.

Blades of the impeller 21 are disposed around the rotating shaft of the motor 3.

The bottom plate 22 is disposed below the impeller 21.

The wind wheel 2 is inserted into the wine glass 6 and located above red wine contained in the wine glass 6.

The wind wheel 2 is horizontally arranged.

An edge portion of the lid 1 is provided with an air outlet 121.

When the motor 3 drives the wind wheel 2 to rotate, air in the wine glass 6 is extracted and discharged from the air outlet 121, such that a micro-negative pressure state is formed inside the wine glass 6 to drive the red wine at the bottom of the wine glass 6 to spirally periodically rotate along a side wall of the bottom of the wine glass 6.

The lid 1 is further provided with a speed control switch 5 for adjusting a rotation speed of the motor 3. Thus, the rotation speed of the wind wheel 2 and the breathing time can be adjusted according to the variety of red wine to achieve the best breathing effect.

In the present embodiment the speed control switch 5 is a potential knob with a switch function.

In other embodiments, the speed control switch 5 may also be a key switch or a rotary switch.

In some other embodiments, the lower cover 12 may be further provided with an LED lamp. At the time of breathing, light can be matched to achieve the effect of heightening the drinking atmosphere.

In some other embodiments, the lid 1 is further internally provided with a battery case for mounting a battery. The motor 3 may also be powered by a dry battery or other power sources.

When the wind wheel of the wind-driven rotating and shaking breather adopting the above technical solution rotates, air flow formed by extracting air in the open container such as a wine glass acts on red wine at the bottom of the open container, thereby driving the red wine to shake and rotate so as to be fully exposed to the air in the process. The oxidation of tannins is accelerated, and the purpose of fast breathing is achieved. Since the air flow is adopted for driving, the wind wheel does not come into contact with the red wine, which is not only cleaner and more hygienic, but also easier to clean after use. When a stable state is reached, the red wine periodically shakes and rotates along an inner wall of the open container. Compared with the method of directly blowing air to red wine, a strong air flow is not formed during the breathing process, thereby reducing the situation of oxidation or volatilization of flavor substances in the red wine, which is conducive to ensure the quality of the red wine.

A breathing method of the wind-driven rotating and shaking breather includes the following steps:

S1: Perform an air extracting operation at an opening of an open container containing red wine by using a wind wheel, and discharge air inside the open container.

S2: Apply an acting force on the red wine contained at the bottom of the open container by air flow formed when the wind wheel discharges the air, such that the red wine is in a disorderly turbulent state.

S3: Continuously discharge the air by the wind wheel to intensify the turbulent state of the red wine and form a rotation at the bottom of the open container.

S4: Allow the wind wheel to continuously rotate, such that the open container is in a micro-negative pressure state, the amount of air discharge is reduced, the turbulent state of the red wine is weakened while the rotation speed is increased, and a vortex flow is gradually formed at the bottom of the open container.

S5: Allow the wind wheel to continuously rotate, such that the micro-negative pressure state in the open container tends to be stable, substantially no air is discharged, and the red wine climbs for a certain height along the internal side wall of the open container and rotates on the internal side wall of the open container at a uniform rotation speed, and the red wine rotating with obvious peaks.

S6: Transmit the work done by the rotation of the wind wheel to the red wine, such that the wine shakes and rotates in a stable state.

In some embodiments, a bottom plate is disposed below the wind wheel, and the air in the open container enters the wind wheel from an internal side wall of the bottom plate and is then extracted by the wind wheel.

The principle of the breathing method is as follows:

Firstly, when the wind wheel rotates, air in the open container is extracted, the air pressure in the open container is lowered, and the air extracted by the wind wheel is gradually reduced until an equilibrium state is reached. In this state, the wind wheel basically extracts air, and all of its work is converted into a disturbance to the air inside the open container.

Secondly, the acting force of air extraction formed when the wind wheel rotates can be decomposed into an upward extraction force in a vertical direction and a rotational force rotating along the inner wall of the open container. The extraction force and the rotational force act simultaneously on the red wine contained at the bottom of the open container. When the stable state is reached in the later stage, the extraction force causes the red wine to climb along the inner wall of the open container, and the rotational force causes the red wine to rotate along the inner wall of the open container, thereby making the red wine have both a shaking state and a rotating state. The climbing height and rotation speed of red wine are positively correlated with the extraction force and the rotational force, and the extraction force and the rotational force correspond to the output kinetic energy of the wind wheel. Therefore, the climbing height and rotation speed of the red wine can be adjusted by adjusting the rotation speed of the wind wheel to further adjust the breathing efficiency.

Further, the red wine shakes and rotates inside the open container, which greatly increases the contact area between the red wine and the air, and also has the function of stirring and homogenizing, thereby achieving the purpose of rapid breathing.

Embodiment 2

Figure 5:
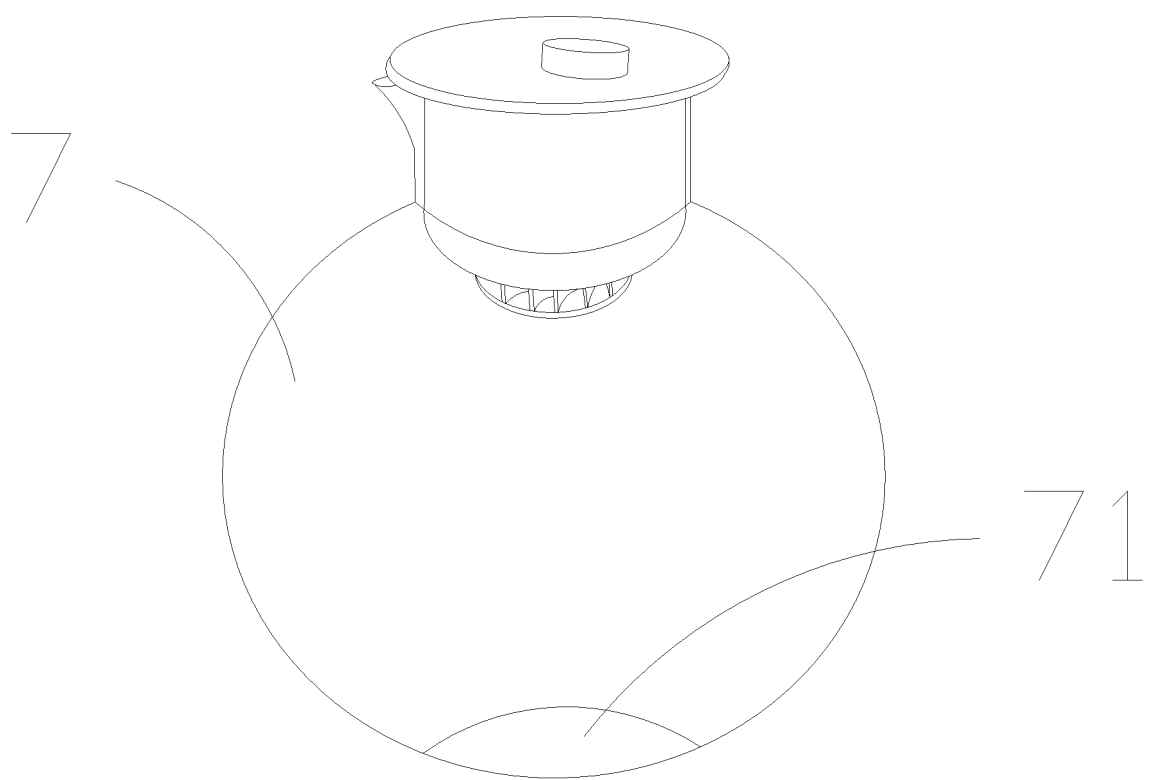
FIG. 5 is a schematic structure view of a wind-driven rotating and shaking breather according to another embodiment of the present invention.

FIG. 5 schematically shows a wind-driven rotating and shaking breather according to an embodiment of the present invention. As shown in the figure, the difference from Embodiment 1 is that the open container is a breathing bottle 7 of which a main body is spherical or approximately spherical. The spherical shape makes it easier for the red wine to periodically shake and rotate along an inner wall of the breathing bottle 7.

The bottom of the breathing bottle 7 forms a spherical projection 71 upward.

The spherical protrusion 71 may concentrate the red wine on the periphery of the bottom of the breathing bottle 7 to form a thick-periphery thin-middle state, which facilitates the formation of a vortex flow in the early stage, and also facilitates the formation of obvious peaks in the later stage.

What have been described above are only some embodiments of the present invention. It will be apparent to those skilled in the art that various modifications and improvements can be made without departing from the creative idea of the present invention. These modifications and improvements fall within the scope of protection of the present invention.

What is claimed is:

1. A wind-driven rotating and shaking breather, comprising an open container having a circular cross section and a lid covering an opening of the open container, wherein the lid is provided with a wind wheel and a motor, a rotating shaft of the motor is connected to the wind wheel, the wind wheel is mounted on a lower portion of the lid and composed of an impeller and a flat bottom plate, blades of the impeller are disposed around the rotating shaft of the motor, the flat bottom plate is disposed below the impeller, the wind wheel, horizontally arranged, is inserted into the open container and located above red wine contained in the open container, an edge of the lid or a side wall of the container is provided with an air outlet, and when the motor drives the wind wheel to rotate, air in the open container is extracted and discharged from the air outlet, such that a micro-negative pressure state is formed inside the open container to drive the red wine at a bottom of the open container to spirally periodically rotate along a side wall of the bottom of the open container.

2. The wind-driven rotating and shaking breather according to claim 1, wherein the lid is further provided with a control panel, the control panel being provided with a speed control switch for adjusting a rotation speed of the motor.

3. The wind-driven rotating and shaking breather according to claim 2, wherein the speed control switch is a potential knob with a switch function.

4. The wind-driven rotating and shaking breather according to claim 2, wherein the lid is further internally provided with a charging circuit and a storage battery.

5. The wind-driven rotating and shaking breather according to claim 2, wherein the lid is further internally provided with a battery case for mounting a battery.

6. The wind-driven rotating and shaking breather according to claim 1, wherein the open container is a wine glass or a breathing bottle or a breathing pot.

7. The wind-driven rotating and shaking breather according to claim 1, wherein a main body of the open container is spherical or approximately spherical.

8. The wind-driven rotating and shaking breather according to claim 1, wherein the bottom of the open container forms a spherical projection upward.

\* \* \* \* \*